May 30, 1967     T. L. BAREFOOT ETAL     3,321,902

VISCOUS DAMPING FOR SPINDLE

Filed Oct. 22, 1965

INVENTORS
THOMAS L. BAREFOOT
IVEY E. MARTIN
BY
*David Rabin*

United States Patent Office 3,321,902
Patented May 30, 1967

3,321,902
VISCOUS DAMPING FOR SPINDLE
Thomas L. Barefoot, Coats, and Ivey E. Martin, Jr., Sanford, N.C., assignors to Roberts Company, Sanford, N.C., a corporation of North Carolina
Filed Oct. 22, 1965, Ser. No. 500,925
5 Claims. (Cl. 57—135)

This invention relates to a textile spindle and more particularly to a textile spindle assembly in which a viscous vibration damping boot is employed for reducing vibration amplitude at high speed spindle operation.

Increased rotational speeds in textile spindles introduces increased amplitudes of vibration axially as well as laterally causing defective bearings and other bearing elements with resulting destruction of additional components of the spindle assembly that normally have prolonged life. Various attempts to utilize rubber grommets, plastic sleeves and other members have not been satisfactory under high operational speeds to reduce vibration and also maintain satisfactory lubrication for the bearings and other elements and components in the spindle assembly. Additionally, after passing through the first critical speed, a second critical speed may be reached at present high speed operations which will produce greatly magnified vibrational amplitudes that must be dampened to prevent spindle distortion and possible destruction.

It is, therefore, an objective of this invention to provide a viscous damping means for textile spindles that will reduce the amplitude of vibration at high operational speeds.

Still another objective of this invention is to provide a damping boot which serves as an hydraulic cushion for textile spindles that will reduce the second critical speeds encountered in high speed spindle operation and that will stabilize spindle action by removing major shocks but which will permit the spindle to seek its own center of rotation at the high speeds of operation.

Still another objective is to provide a sealed fluid damping boot for positioning at one end of a textile which will be sufficiently flexible and deformable to retain a viscous fluid in a sealed compartment or chamber capable of withstanding the deleterious action of lubricating oils while shielding certain bearings and components without any contamination entering the sealed chamber of the damping boot.

Another objective of this invention is to provide a sealed chamber that is flexible for retaining a viscous fluid to serve as a vibration damping member reducing axial as well as lateral vibrational forces with a minimum of maintenance for the damping member.

Other objectives and many of the attendant advantages of this invention for a viscous damping boot or member for a textile spindle as well as other spindle applications will be readily apparent from the following detailed description taken in conjunction with the accompanying drawings in which like references refer to corresponding parts throughout the several views, and wherein.

Figure 1:
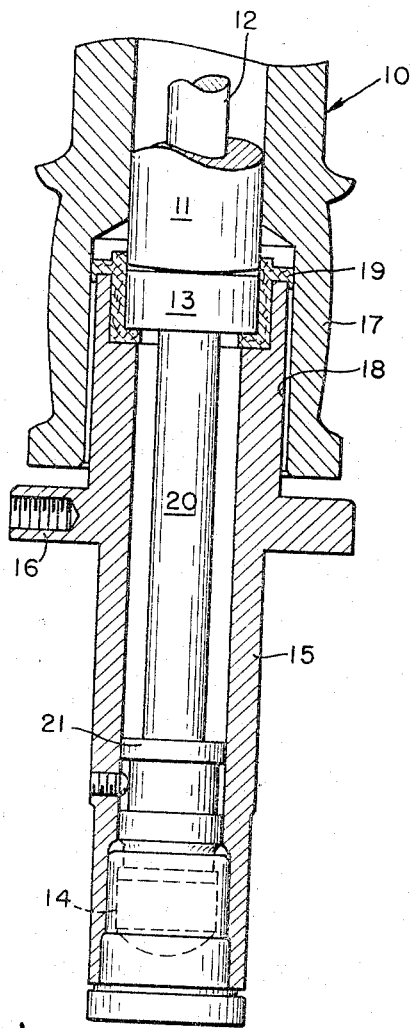
FIG. 1 is a partial longitudinal sectional view of a textile spindle base employing a vibration damping boot of this invention at one end thereof.
Figure 2:
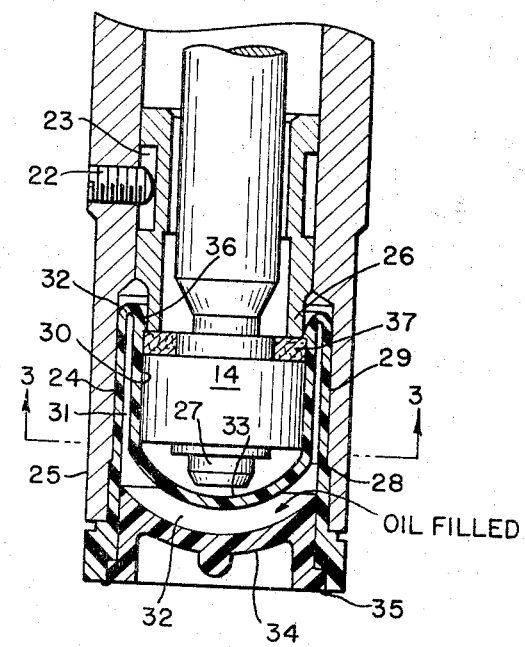
FIG. 2 is an enlarged longitudinal sectional view of the assembly of FIG. 1 illustrating the orientation of the spindle shaft and bearing member enclosed within the vibration damping boot.
Figure 4:
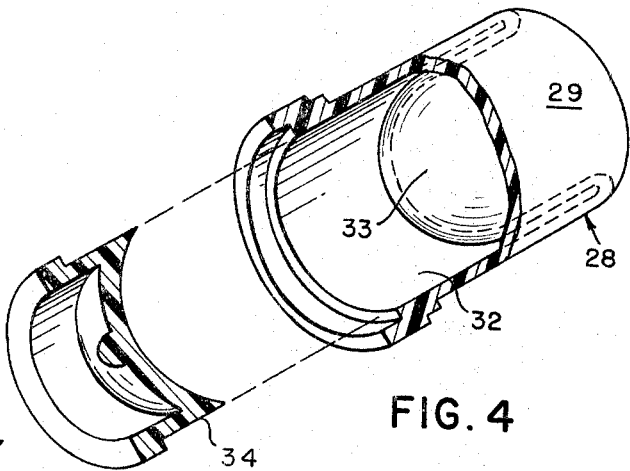
FIG. 4 is an exploded perspective view with a portion removed of the viscous damping boot.
Figure 3:
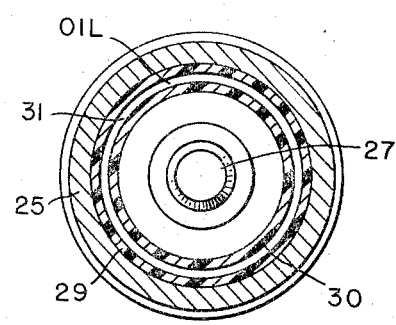
FIG. 3 is a transverse sectional view taken substantially along the plane of section line 3—3 of FIG. 2.

Referring to the drawing and particularly to FIG. 1, there is shown only the lower portion of a textile spindle assembly 10 in which the spool or bobbin-supporting member 11 is illustrated with only its terminal portion mounted on the spindle shaft 12 that is bearingly supported by means of the axially spaced-apart ball bearing members 13 and 14 that are retained in the spindle base housing 15 that is provided with a suitable mounting flange 16. The spindle tape drive sleeve 17 may be press fit on the spindle 11 with the cylindrical inner wall 18 encircling the upper portion of the housing 15 with sufficient clearance to permit free rotation. A suitable packing gland 19 is provided around the bearing member 13 which bearing member may be inscribed by a suitable neoprene upper boot for bearing protection.

The intermediate portion of shaft 12 will be referred to interchangeably as the blade 20 that is guidably positioned through the doffer guard 21 with its position being maintained by means of the set screw 22 threadably retained in the base 15 to extend into the doffer guard circumferential recess 23.

An internal cylindrical cavity 24 in the terminal end 25 of the base 15 cooperatively receives the reduced terminal end wall 26 of the doffer guard 23, the bearing member 14 and the terminal end 27 of the blade 20. Heretofore various types of grommets, packing glands, and lubricants have been utilized around the bearing member without adequate reduction of vibration at high operational rotation speeds.

A viscous damping boot is insertable into the cylindrical chamber 24 with its outer wall 29 preferably forming a press fit into the cylindrical chamber. An inner wall 30 is radially spaced inwardly from the outer wall forming, between the outer wall 29 and the inner wall 30, an annular cavity or chamber 31. One end of the annular chamber 31 is sealed closed by the bend 32. The inner wall 30 and the spherically-shaped base 33 form a bearing-receiving chamber with its accompanying blade end 27. The depending skirt 29 of the outer wall extends for an axial length preferably greater than the axial extent of the partially spherically-shaped portion 33 providing a reservoir 32 formed between the end sealing cap 34 and the spherically-shaped portion 33 and the annular chamber 31. A suitable relatively viscous oil may be used to at least partially fill the reservoir 34 and the annular chamber 31. It has been found desirable to use a thermoplastic material such as polyurethane or polyethylene as the deformable and flexible damping boot permitting a unitary structure that may be sealed such as around the perimeter of the sealing cap 34 along the line 35. In some instances it is desirable to seal the boot after the fluid has been inserted although in other instances the boot may be sealed throughout and the fluid may be introduced by means of a suitable injection needle with the needle opening sealed after being withdrawn. Once sealed, the damping boot not only serves as a guard and shield for the bearing member 14 but also serves to reduce vibrational amplitude axially and laterally. It will be readily understood that although polyurethane and polyethylene have been mentioned, other flexible and resiliently deformable materials may be utilized without restriction and within the spirit of this invention.

In one embodiment of the damping boot, the inner and outer walls are each .025 of an inch thick and have been found to be suitable for optimum results at increased speeds of operation.

To facilitate a more secure seating of the bearing member 14, a circumferential shoulder 36 may be provided in the inner wall 30 against which a disc 37 will be positioned to protect the bearing member 14 from any dirt accumulation.

Many modifications and variations may be made to the configuration of the viscous damping boot including the configuration of the annular cavity between walls as well as in the volume of fluid retained without departing from the true purpose and spirit of this invention and such modifications are contemplated within the appended claims.

What is claimed is:

1. In a textile spindle assembly having a base housing with an axial bore for rotatably and bearingly supporting the lower end of a yarn bobbin-supporting spindle shaft having an encircling tape-engaging drive sleeve for rotating the spindle, a viscous damping boot mounted in the base housing for cooperatively receiving a bearing mounted on the end of the shaft, said boot having a sealed chamber at least partially enclosing said bearing and the shaft end, and a fluid in said chamber for reducing vibrational ampltiude and stabilizing spindle axial and lateral deflection, said boot comprising a flexible and deformable bearing-receiving inner wall and outer wall spaced from each other forming at least an annular chamber, means axially spaced from said annular chamber sealing said boot, and the fluid in said annular chamber, said inner wall having a circumferential shoulder extending inwardly therefrom for retaining the shaft-mounted bearing during the doffing operation.

2. In a textile spindle assembly as claimed in claim 1, said assembly further comprising a buffering disc sealably positioned between said circumferential shoulder and the shaft-mounted bearing to preclude dirt accumulation on the bearing and absorb vibrational shock.

3. In a textile spindle assembly as claimed in claim 1, said boot being formed of polyurethane.

4. In a textile spindle as claimed in claim 1, said boot being formed of a deformable, resilient plastic material capable of retaining a viscous fluid.

5. In a textile spindle as claimed in claim 1, said boot being made of a thermoplastic deformable and flexible plastic material.

References Cited
UNITED STATES PATENTS

| | | | |
|---|---|---|---|
| 2,609,254 | 9/1952 | Harris | 57—135 X |
| 2,724,945 | 11/1955 | McGhee | 57—135 |
| 2,969,262 | 1/1961 | Staufert. | |
| 3,153,314 | 10/1964 | Hammond | 57—135 |
| 3,164,947 | 1/1965 | Gaston | 57—140 |

FRANK J. COHEN, *Primary Examiner.*

A. J. SIDOTI, *Examiner.*